March 28, 1950

C. T. DENKER ET AL 2,501,763

SOLID FUEL FURNACE OF THE ROTARY GRATE PROGRESSIVE FEED TYPE

Filed March 26, 1945

Inventors:
Charles T. Denker
Adolph T. Johanson
By Wallace and Cannon
Attorneys

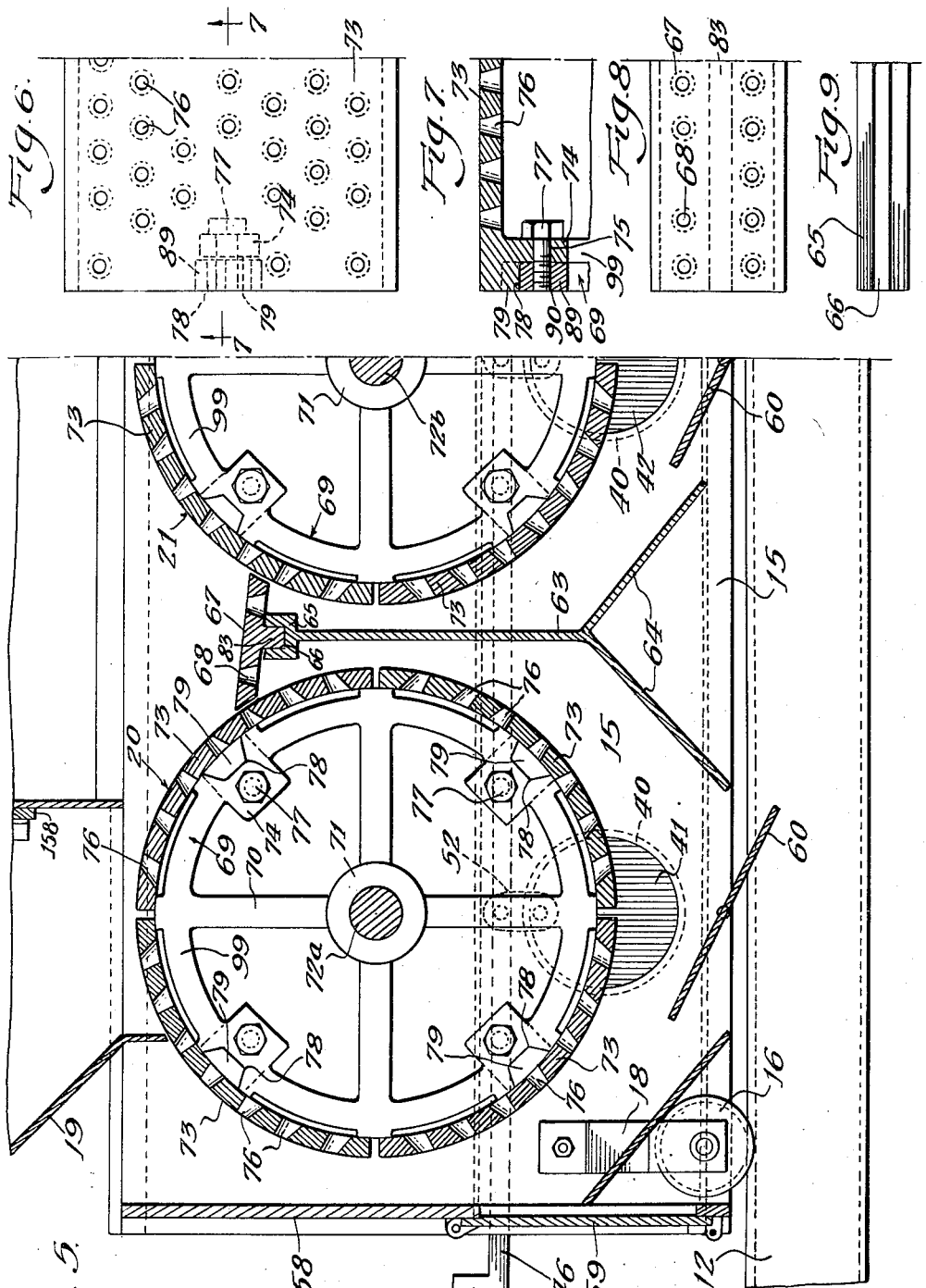

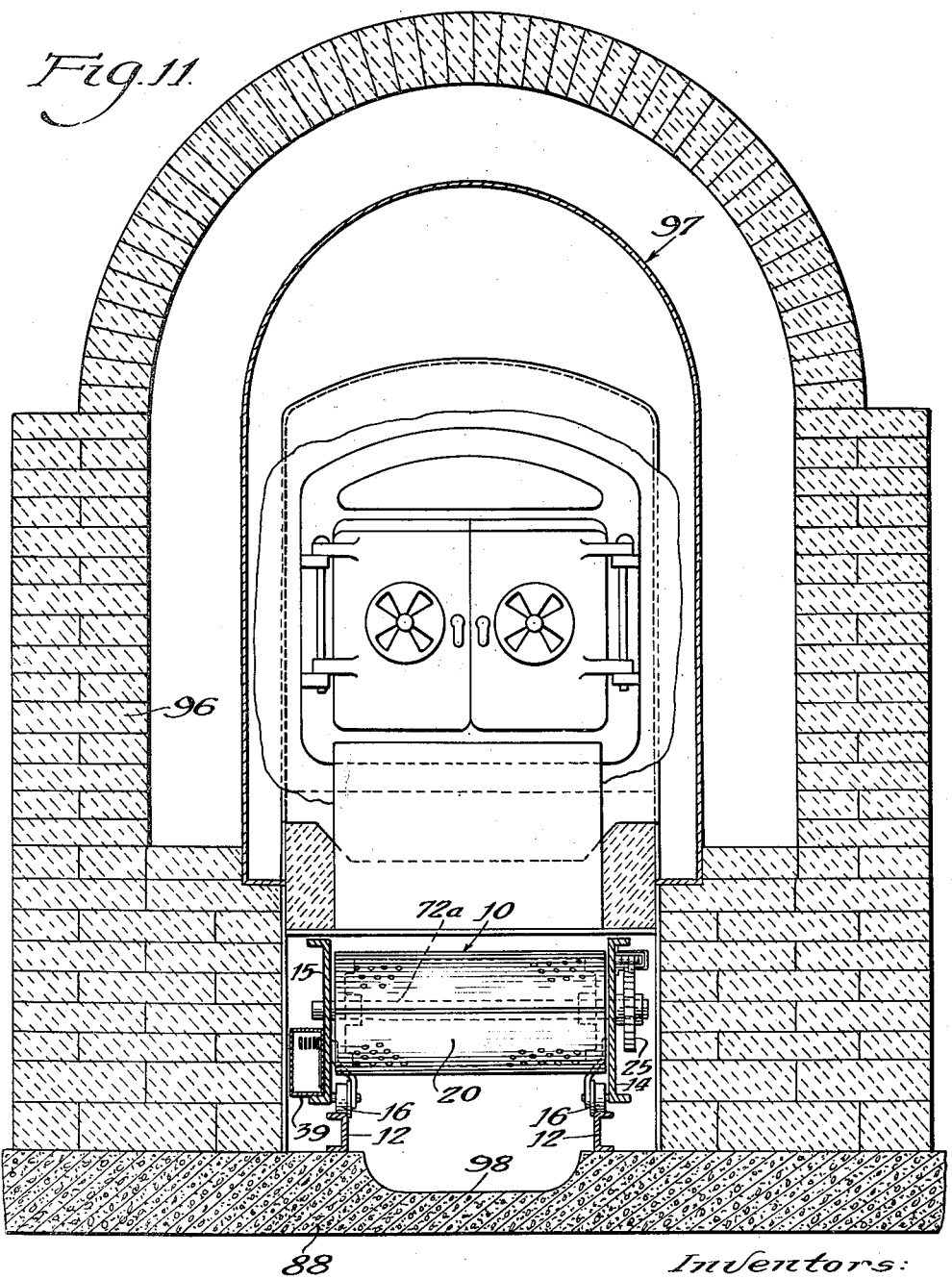

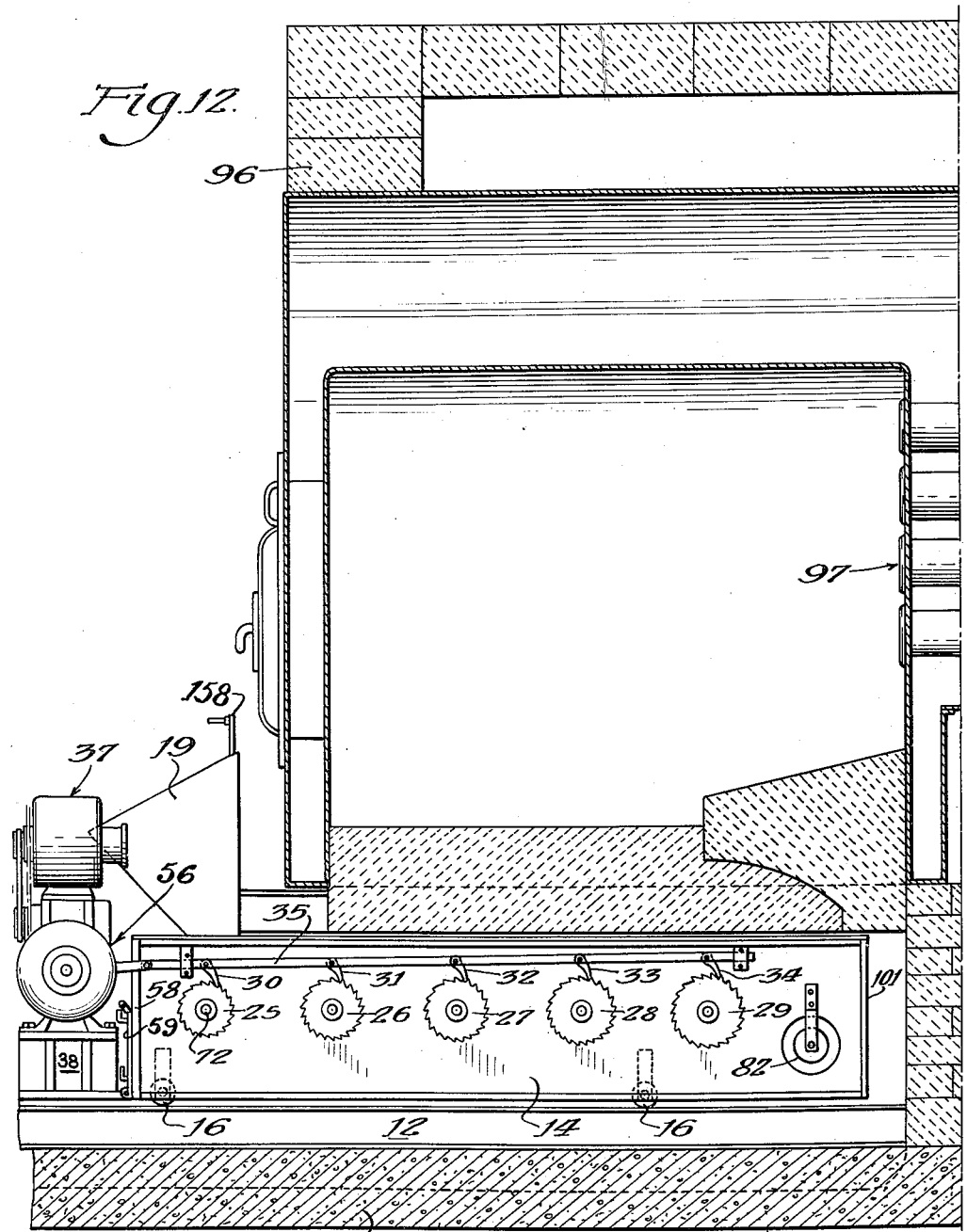

Patented Mar. 28, 1950

2,501,763

UNITED STATES PATENT OFFICE 2,501,763

SOLID FUEL FURNACE OF THE ROTARY GRATE PROGRESSIVE FEED TYPE

Charles T. Denker, Chicago, and Adolph T. Johanson, Glenview, Ill.

Application March 26, 1945, Serial No. 584,860

7 Claims. (Cl. 110—35)

This invention relates to a heating apparatus. More specifically, this invention relates to certain improvements in a stoker unit for a heating furnace and to certain improvements in air draft apparatus embodied in the new stoker unit.

As is well known, one of the principal difficulties heretofore experienced in the burning of coal in furnaces and particularly low grade coals of high sulphur and high mineral content, has been the formation of clinkers. The removal of such clinkers from the grates of a furnace not only requires considerable time and labor, sometimes causes damage to the grates due to overheating, and also frequently results in damage to the brick fire walls of the furnace when clinker bars are used in the furnace for the purpose of breaking up and removing such clinkers. Moreover, the formation of such clinkers indicates inefficient operation of a furnace and incidental incomplete combustion of the coal supplied thereto.

We have found that in the use of the new stoker unit which forms the subject matter of the present invention the formation of clinkers is substantially eliminated. This is accomplished, in general, by keeping the fuel bed in constant motion during combustion while at the same time effectively controlling the air draft supplied to the fuel bed so as to insure substantially complete combustion of the coal under varying atmospheric conditions and in accordance with the needs of the fuel being used in the furnace.

An object of the invention is, therefore, to provide a new and improved heating apparatus or stoker unit for use in stationary furnaces, marine furnaces, locomotives, and the like and which in use substantially eliminates the formation of clinkers and efficiently consumes coal or like fuel supplied thereto including low grade high sulphur and high mineral content coals frequently considered unsuitable for certain of such uses.

Another object of the invention is to construct and arrange the air draft apparatus embodied in the invention in the new stoker unit in such a manner that the grate construction of the new stoker unit is divided into zones, the air draft to each of which zones may be selectively controlled depending upon the requirements of the particular fuel being used in the furnace, the temperature of the fire desired therein, the surface area of the fire bed, the quality of the fuel being consumed, atmospheric conditions, and other factors.

An additional object of the invention is to provide a novel substantially continuous stoker grate construction which is composed of a plurality of rotary grate drums and a stationary grate bar disposed between each adjacent pair of grate drums and cooperating with the rotary grate drums to provide a substantially continuous grate over which the coal or like fuel bed is moved slowly but continuously as it passes through the furnace during the combustion operation.

An additional object of the invention is to provide a novel apparatus for controlling the speed of rotation of the rotary grate drums to the end that the grate drum disposed nearest the fuel hopper, at the fuel-receiving end of the grate, is rotated somewhat faster than the succeeding grate drums as all of the grate drums are rotated to advance the coal or like fuel bed slowly over the grate construction.

A further object of the invention is to provide a novel apparatus for selectively and manually controlling a forced air draft to the various zones into which the grate construction embodied in the new stoker unit is divided.

Another object of the invention is to provide a novel construction and arrangement in the grate drums and for assembling the various segments embodied therein upon their supporting wheels.

Still another object of the invention is to provide a novel construction and arrangement for mechanically and automatically ejecting from the discharge end of the new stoker grate construction the relatively small quantity of finely divided ashes which remain or are left over at the end of the combustion operation.

Other and further objects of the present invention will be apparent from the following description and claims and are illustrated in the accompanying drawings which, by way of illustration, show preferred embodiments and the principles thereof and what I now consider to be the best modes in which I have contemplated applying those principles. Other embodiments of the invention embodying the same or equivalent principles may be used and structural changes may be made as desired by those skilled in the art without departing from the present invention and the purview of the appended claims.

Fig. 5 is a fragmentary enlarged vertical sectional view on line 5—5 in Fig. 2 illustrating in detail the construction of one of the rotary grate drums and one of the stationary grate bars disposed between each two adjacent grate drums, and other parts embodied in the new heating apparatus;

Fig. 6 is a fragmentary top plan view of one of the new rotary grate drums illustrating the manner in which the segments of the grate drums are mounted upon their supporting wheels;

Fig. 7 is a sectional view, on line 7—7 in Fig. 6, and further illustrating the manner in which the segments of the grate drums are mounted upon and are attached to their supporting wheels;

Fig. 8 is a fragmentary top plan view of one of the stationary grate bars one of which is disposed between each two adjacent grate drums;

Fig. 9 is a fragmentary top plan view of one of the supporting members for the stationary grate bars, said supporting members also functioning as partitions to divide the stoker into air draft zones;

Fig. 10 is a fragmentary detail view on line 10—10 in Fig. 2, partly in section and partly in elevation, illustrating the manner in which the ash-ejecting worm screw is automatically driven from the adjacent rotary grate drum;

Fig. 11 is a view partly in end section and partly in end elevation illustrating the new stoker unit arranged in position of use in a typical stationary furnace; and Fig. 12 is a fragmentary vertical sectional view illustrating the new stoker unit as it appears in position of use in a typical stationary furnace such as is generally illustrated in Fig. 11.

Figure 1:
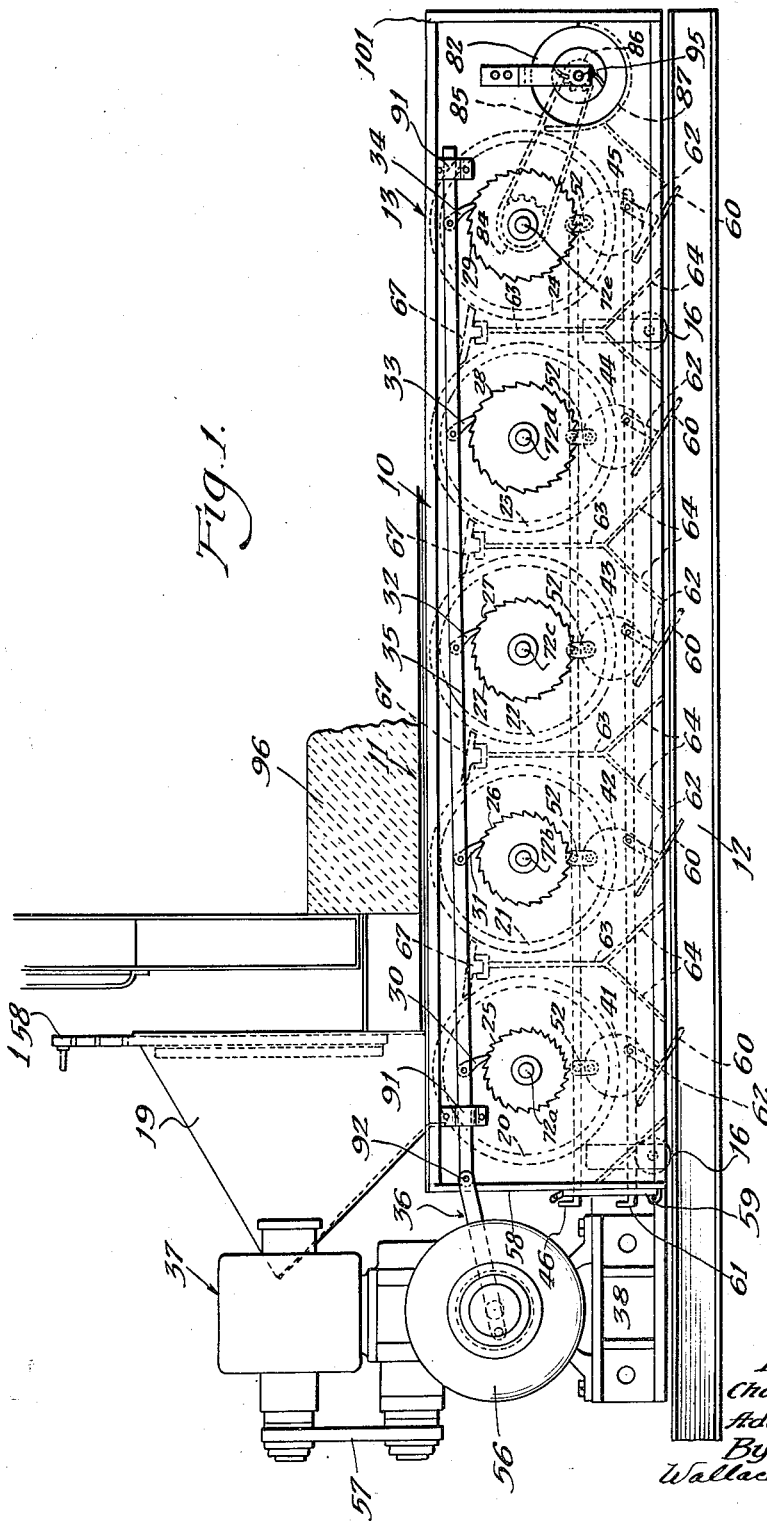
Fig. 1 is a side elevational view illustrating a preferred embodiment of the new stoker unit, only a part of the furnace with which it may be used being shown.

A preferred embodiment of the new heating apparatus or stoker unit is illustrated in the drawings, and is therein generally indicated at 10, and may be used in conjunction with stationary furnaces or boilers, marine furnaces or boilers, or with locomotive boilers, or the like. Since the construction of the particular furnace and boiler with which the new heating apparatus may be used form no part of the present invention, the same will not be described in detail herein.

However, a typical installation of the new stoker unit is shown in the drawings, and particularly in Figs. 11 and 12, wherein the new stoker unit 10 is shown as being mounted in a stationary furnace which embodies a stationary boiler 97, which is enclosed in a brick furnace wall 96. As shown in Fig. 11, the stationary heating furnace therein illustrated has a concrete base 88 which is shown as being provided with a conventional ash pit 98.

The new heating apparatus or stoker unit 10 embodies a wheel-bearing carriage or supporting frame 11 which may be moved as a self-contained unit into and out of a furnace or fire box. To this end the wheel-bearing carriage or supporting frame 11 includes channel-shaped side walls 14 and 15 from which wheels 16 are suspended by means of hanger brackets 18. These wheels 16 are movable over rails 12 which may be arranged or mounted upon the base or floor of the fire box of the furnace at opposite sides of the ash pit 98. The supporting frame or carriage 11 also includes a front wall 58 and a rear wall 101 which extend between the side walls 14 and 15 at the ends thereof.

The new stoker unit 10 includes a bank or row of rotary grate drums 20, 21, 22, 23 and 24 which are arranged at spaced intervals upon the supporting frame 11. These rotary drums 20, 21, 22, 23 and 24 are mounted upon supporting shafts 72a, 72b, 72c, 72d and 72e, respectively, and the end portions of these shafts are journaled in the side walls 14 and 15 of the wheel-bearing carriage or supporting frame 11. Mounted upon the shafts 72a, 72b, 72c, 72d and 72e are ratchets 25, 26, 27, 28 and 29, and engageable with these ratchets are pawls 30, 31, 32, 33 and 34, respectively. These pawls 30, 31, 32, 33 and 34 are mounted upon a horizontally slidable operating bar or rod 35 which is guided in suitable guide members 91 which are attached to the side wall 14 of the supporting frame or wheel-bearing carriage 11. The operating bar or rod 35 is pivotally connected at one end, as at 92, Fig. 1, to an eccentric mechanism 36 and this eccentric mechanism 36 is, in turn, operatively connected to a speed reduction gear unit 56 which is operated by a power-transmitting member or belt 57 and a motor driving unit 37. The motor driving unit 37 and speed reduction gear unit 56 are supported upon a platform or shelf 38 which, in turn, is attached to the side wall 14 of the supporting frame 11, as shown in Figs. 1, 2 and 3.

Figure 2:
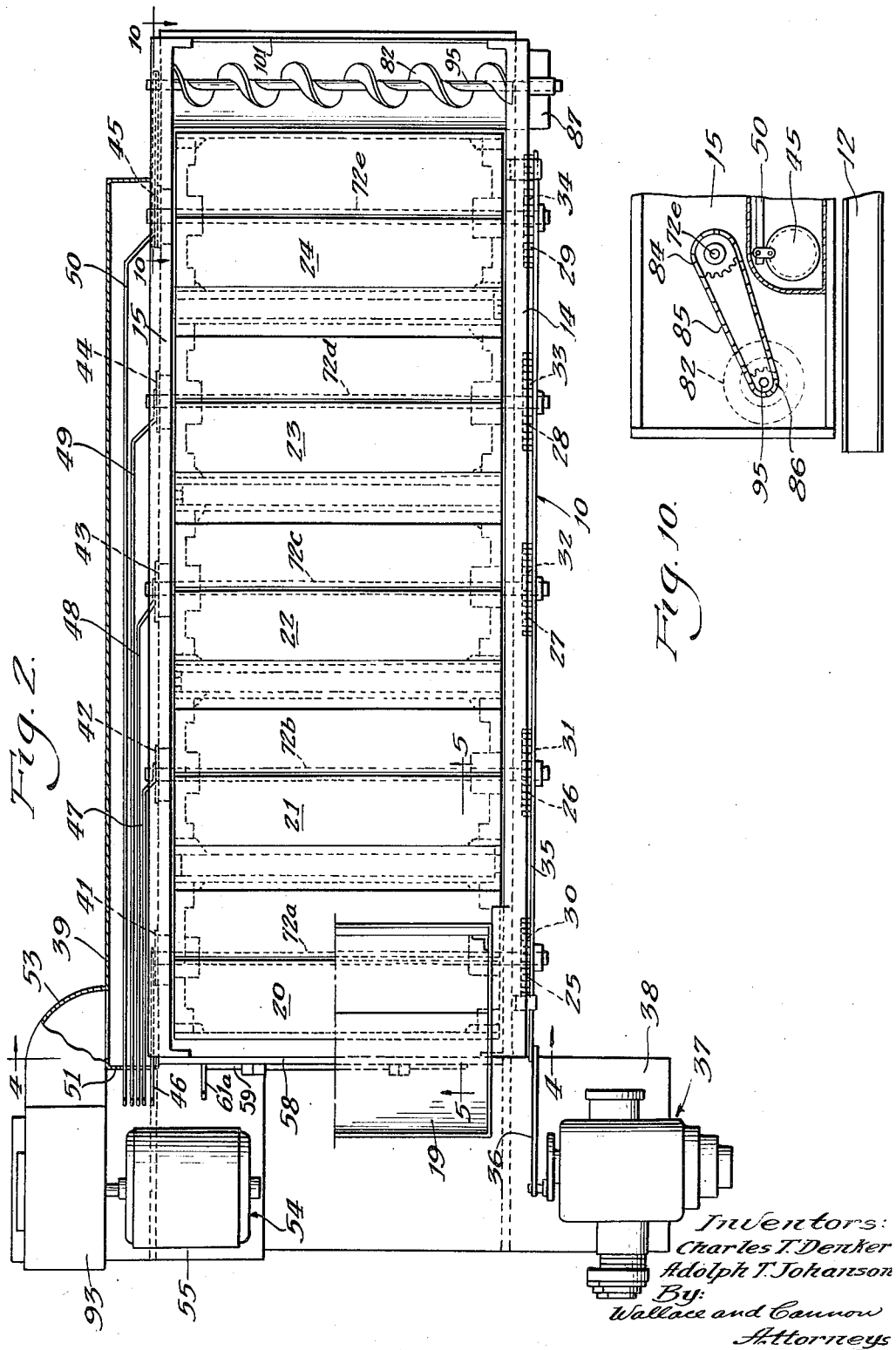
Fig. 2 is a top plan view of the new heating apparatus shown in Fig. 1, partly in section, none of the parts of the furnace with which the new stoker construction may be used being shown.
Figure 3:
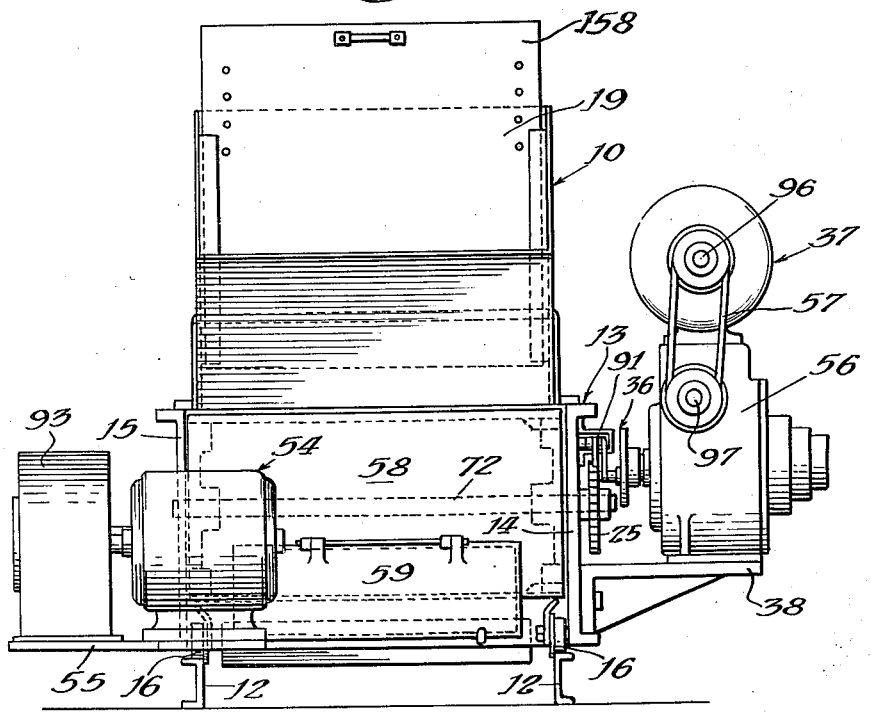
Fig. 3 is an end elevational view of the new heating apparatus as seen from the left-hand end in Figs. 1 and 2, none of the parts of the furnace being shown.

Arranged at the front or fuel-receiving end of the new heating apparatus or stoker unit (left-hand end as seen in Figs. 1 and 2) is a coal hopper 19 which is provided with a slidable fuel control door 158 so as to control the passage of coal or like fuel from the hopper 19 onto the upper surface of the first or nearest rotary grate drum 20. A fire door 59 is hingedly mounted on the front wall 58 of the supporting frame 11, adjacent the hopper 19.

Disposed between each two adjacent grate drums, and as is shown in detail in Fig. 5, is a stationary grate bar 67 which is provided with a series of draft openings 68. As shown in Fig. 5, the upper surface of each of these stationary grate bars 67 is inclined downwardly from its left or fuel-receiving end to its right or fuel-discharging end so as to facilitate the movement of the coal bed thereover, by gravity, as the fuel bed is slowly but continuously moved over the grate construction embodied in the new stoker unit and of which the stationary grate bars 67 form a part.

As shown in Fig. 5, each of the stationary grate bars 67 has an axially extending rib 83 on its under side and each of these ribs 83 is mounted in a socket 66. Each of these sockets 66 is formed in a head 65 of a combination partition wall and supporting member 63 one of which is disposed between each two adjacent rotary grate drums. Each of these combination partition walls and supporting members 63 extends between and is supported by the side walls 14 and 15 of the supporting frame 11 and each of these combination partition and supporting members 63 has a pair of spaced oppositely inclined baffle plates 64 integrally sewed thereto at its lower end.

The construction of the rotary grate drums 20, 21, 22, 23 and 24, is shown in detail in Figs. 5, 6 and 7. As there shown, each grate drum includes a pair of spaced supporting wheels 69 and each of these supporting wheels 69 includes a rim 99, a hub 71, and radially arranged spokes 70, and the hubs 71 of these supporting wheels are mounted on the shafts 72 at opposite ends thereof. As shown in Fig. 5, the grate surface of each rotary grate drum is composed of four segments 73 each of which is provided with spaced draft openings 76 and the four segments 73 in each grate drum are mounted upon their supporting wheels 69 in a manner which is best illustrated in Figs. 5, 6 and 7 and which is as follows: The rim 99 of each of the supporting wheels 69 is provided with four spaced recesses 78, spaced at regular intervals therearound. The rim 99 of each of the supporting wheels 69 is also provided or formed with a depending attaching lug 89 and the lugs 89 project radially inwardly from the inner surfaces of the rims 99 at points disposed radially inwardly of the corresponding recesses 78. Each grate segment 73 is provided on its inner surface with a lug or boss 79 and each of these bosses or lugs 79 fits into one of the correspondingly shaped recesses 78 formed in the rims 99 of the supporting wheels 69. Likewise, each of the grate drum segments 73 has a depending attaching lug 74 formed thereon, on its under surface. Each of these lugs 74 is provided with an opening 75 and each of these openings 75 is disposed in alignment with a threaded opening 90 formed in the adjacent attaching lug 89 on one of the supporting wheels 69. Detachable interconnection between each grate bar segment 73 and its supporting wheels 69 is effected by inserting bolts 77 through the openings 75 in the attaching lugs 74, which are formed in the grate bar segments 73, and into the corresponding threaded openings 90 in the attaching lugs 89 on the supporting wheels 69, as shown in Figs. 5, 6 and 7.

The new stoker unit includes a novel construction and arrangement for selectively providing and controlling an air draft to each of the zones or areas into which the grate surface of the new stoker unit is divided by the vertical partition walls 63 and attached baffle plates 64. To this end, the side wall 15 of the supporting frame 11 is provided with a series of spaced air inlets or ports 40 and one of these air inlets or ports 40 opens into one of the aforesaid zones or areas into which the grate surface is divided. These air inlets or ports 40 are selectively closed and opened by dampers 41, 42, 43, 44 and 45 and these dampers 41, 42, 43, 44 and 45 are mounted upon the outer side of the side wall 15 of the supporting frame 11 and within an air duct 39 which is mounted on the side wall 15 of the supporting frame 11 and extends lengthwise thereof. As shown in Fig. 2, this air duct 39 is connected by a branch air duct 53 to a blower fan housing 93 in which a blower fan (not shown) is arranged. This blower fan is operated by means of a suitable motor driven operating unit 54 which is mounted on a shelf or supporting platform 55 which is mounted on the supporting frame 11 at the front thereof (Figs. 2 and 3).

Each of the dampers 41, 42, 43, 44 and 45, is selectively and manually controlled or opened and closed by a manually operable and slidable control bar. These manually operable damper control slide bars are generally indicated at 46, 47, 48, 49 and 50 and are slidably mounted in the air duct 39, and the front end portions thereof are slidably mounted in openings provided in the front wall 51 of the air duct 39 (Fig. 2). The damper 41 is operatively connected by a link 52 to the slide bar 46; the damper 42 is operatively connected by a similar link 52 to the slide bar 47; the damper 43, is operatively connected by a link 52 to the slide bar 48; the damper 44 is operatively connected by a link 52 to the slide bar 49; and the damper 45 is operatively connected by a link 52 to the slide bar 49. As best shown in Fig. 2, in order to facilitate this connection between the links 52 and the slide bars 47, 48, 49 and 50 the inner end portions of these four slide bars 47, 48, 49 and 50 are offset somewhat so that the main body portions of all five slide bars 46, 47, 48, 49 and 50 extend parallel to each other.

Figure 4:
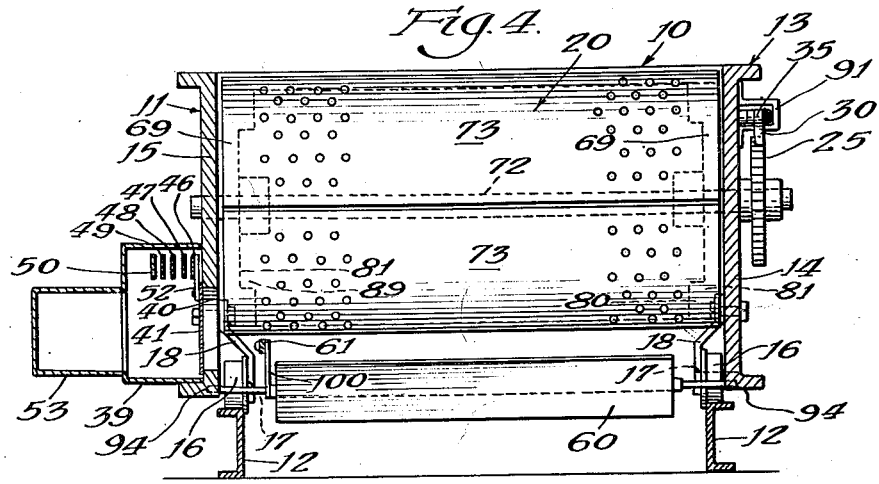
Fig. 4 is a view on line 4—4 in Fig. 2, partly in section and partly in elevation.

A row of air baffle plates or dampers 60 is arranged between the side walls 14 and 15 of the supporting frame 11, one below each of the air inlets or ports 40. Each of these air baffle plates or dampers 60 is pivotally mounted at its ends upon trunnions 94 which are journaled in the side walls 14 and 15 of the carriage or supporting frame 11. All of these air baffle plates 60 are operated and controlled by a common manually operable and slidable control bar 61 which extends lengthwise of the wheel-bearing carriage or supporting frame 11 between the sides thereof. This slide bar 61 has a handle portion 61a which extends through an opening formed in the front wall 58 of the carriage or supporting frame 11, as shown in Figs. 1 and 2. As shown in Fig. 4, each of the baffle plates or dampers 60 is operatively connected to the manually operable and slidable control bar 61 by a connecting link 62.

The new heating apparatus or stoker unit embodies a novel construction and arrangement for eliminating such finely divided ashes as are left over from the combustion operation. This device for automatically removing such ashes includes an ash-ejecting member in the form of a worm screw 82 which is mounted upon a shaft 95, as shown in Fig. 2, and the end portions of this shaft 95 are journaled in the side walls 14 and 15 of the supporting frame or carriage 11 at the inner or ash-receiving end thereof. A pulley 86 is mounted upon the worm screw shaft 95 at the end thereof and this pulley 86 is operatively connected by a belt 85 to a pulley 84 which, in turn, is mounted on the shaft 72e which supports the rotary grate 24, as shown in Fig. 1. Disposed below the ash-ejecting worm screw 82, and extended transversely across the supporting frame or carriage 11, between the side walls 14 and 15 thereof is an ash pan or apron 87, one end portion of which projects through an opening (not shown) which is formed in the side wall 14 of the carriage or supporting frame 11 at the inner or ash-receiving end thereof (Fig. 2).

In the use and operation of the new heating apparatus or stoker unit the said stoker unit 10 may be associated with a stationary furnace or with a marine furnace or boiler, or the like, in the manner illustrated in Figs. 11 and 12 of the drawings, this being accomplished, in general, by running the wheel-bearing carriage 11 along the tracks or rails 12 into position, as shown. The hopper 19 being empty, the door 158, which is mounted upon the rear wall of the hopper 19 may then be opened and a suitable fire kindled in the furnace on that section or area of the grate surface which is formed by the rotary grate drums 20 and 21 and the intermediate stationary grate bar 67. The hopper door 158 being open, a sufficient quantity of coal may be dropped by gravity onto the upper surface of the first or adjacent rotary grate drum 20, into contact with the kindling fire, just referred to. After the kindled fire has had sufficient start a full supply of finely divided coal or like finely divided solid fuel may be placed in the hopper 19, through the open upper end thereof, and fed by gravity on to the grate drum 20. The motor driving unit 54 for the blower fan unit 93 may then be set in operation, by manipulating a control switch (not shown) but which may be mounted upon an instrument panel which may be provided at any suitable point on the supporting frame or wheel-bearing carriage 11. A forced air draft will then flow from the blower fan housing 93, through the branch air duct 53, and into the main air duct 39. The manually operable control bar 46 may then be manipulated to open the damper 41 which controls the air inlet 40 into the first zone of the new heating apparatus. A forced air draft will then flow into the new stoker unit below the first rotary grate drum 20 and will be directed by the adjacent damper 60 and baffle plate 64 and the partition wall 63 up through the draft openings 76 in the rotary grate drum 20 and up through the draft openings 68 in the first stationary grate bar 67 which is disposed between the grate drums 20 and 21. The initial supply of coal thus fed into the furnace, onto the kindling fire, will thus be ignited.

The operating mechanism for the rotary grate drums 20, 21, 22, 23 and 24 may then be set in operation by operation of a manually operable control switch (not shown) for the motor driving unit 37. Power will then be transmitted from the motor driving unit 37 and its driving shaft 96 through the belt 57 to the drive shaft 97 of the speed reduction gear unit 56, thence through the eccentric mechanism 36 to the operating slide bar 35, and thence by way of the pawls 30, 31, 32, 33 and 34 to the ratchets 25, 26, 27, 28 and 29, respectively, thereby advancing the rotary grate drums 20, 21, 22, 23 and 24, respectively, in a rotary step by step slow motion. It will be noted, in this connection, that operation of the eccentric mechanism 36 reciprocates the operating slide bar 35 in the guideways 91 and during each cycle of its operation the slide bar and attached pawls 30, 31, 32, 33 and 34 rotate the rotary grate drums 20, 21, 22, 23, and 24 one circumferential step, in a clockwise direction, as seen in Figs. 1 and 5.

It will also be noted, in this connection, that due to the varying diameters of the ratchets 25, 26, 27, 28 and 29 the motion of the rotary grate drums 20, 21, 22, 23 and 24 is progressively slower from the coal-receiving end of the grate surface to the ash-ejecting end thereof. In other words, the first rotary grate drum 20, which receives the supply of coal directly from the mouth or outlet of the hopper 19, rotates somewhat faster than any of the succeeding grate drums 21, 22, 23 and 24, that is to say, it is rotated through a longer circumferential step at each movement thereof than any of the remaining grate drums.

It will thus be seen that after the coal or fuel bed is ignited in the first zone of the furnace it is carried progressively forward into the succeeding zones and rotation of the rotary grate drums 20, 21, 22, 23 and 24 and is advanced over the inclined stationary grate bars 67 which facilitate the advancing movement of the coal or fuel bed over the upper surface of the grate construction embodied in the new stoker unit.

As the coal bed is thus advanced over the grate surface the dampers 42, 43, 44 and 45 may be successively opened so as to open the air ports or valves 40 into the succeeding zones, this being accomplished by successive manipulation of the manually operable and slidable control bars 47, 48, 49 and 50.

It has been found in the practice of the present invention that the combustion of the fuel supplied thereto is so thorough and thermally efficient that at the completion of the combustion operation only a very small quantity of finely divided ashes is left over from the burning of the coal or like fuel. Such ashes are discharged from the surface of the innermost or last rotary grate drum 24 onto the ash pan 87 and are automatically ejected by the worm screw 82 from the ash pan 87 to a point externally of the furnace or fire box with which the new heating apparatus is associated.

During this operation the ash-ejecting worm screw 82 and its supporting shaft 95 are operated by power supplied from rotation of the shaft 72e through the pulley 84, belt 85 and pulley 86.

It will be noted that in the use of the new heating apparatus the construction and arrangement of the rotary grate drums 20, 21, 22, 23 and 24, and the intermediate stationary coal or fuel bed is slowly advanced in a substantially continuous creeping motion while, at the same time, the forced air draft may be supplied to the slowly advancing coal or fuel bed throughout the various zones of the new stoker unit to insure substantially complete combustion of the coal, substantially complete elimination of clinkers, and resulting efficient operation.

In use the new heating apparatus or stoker unit will operate continuously without attention, as long as a supply of coal or like fuel remains in the hopper 19, since the coal is automatically fed into the furnace and such ashes as remain are automatically ejected after the completion of the combustion operation.

It is also found that by dividing the grate surface of the new stoker unit into the several zones, hereinbefore described, it is possible to control the volume of air fed to each zone in accordance with the requirements of, and the quantity and quality of the coal or like fuel employed; and in accordance with the degree of heat or temperature which it is desired to develop during the combustion operation depending upon atmospheric and other variable conditions.

If and when it is desired or necessary to repair or replace the new heating apparatus or any part or parts thereof, the supporting frame or wheel-bearing carriage 11 may be withdrawn as a unit, from the fire box of the furnace with which the new stoker unit is used, by rolling the wheels 16 of the carriage 11 along the trackway or supporting rails 12.

If and when it shall be necessary to replace one or more of the segments 73 of one of the rotary grate drums 20, 21, 22, 23 and 24 this may be accomplished by withdrawing the carriage 11 from the fire box of the furnace, as just described, and detaching the particular segment 73, which it is desired to replace, by removing the bolts 77 from their mountings, illustrated in Figs. 5, 6 and 7, and hereinbefore described, and then lifting the thus freed segment 73 and its attached lugs 79 from the recesses 78 in the rims 99 of the supporting wheels 69 of the particular grate drum in which the damaged grate segment 73 is mounted.

As shown in Fig. 5, each of the stationary grate bars 67 may be readily removed, for replacement or repair (after withdrawal of the carriage 11 from the fire box of the furnace), by lifting the supporting rib 83 of the stationary grate bar 67 up out of its supporting trough or recess 66 in the corresponding combustion supporting member and partition member 63.

While we have described the use of a forced air draft hereinbefore, it will be understood that the air draft control apparatus embodied in the new stoker unit 10 may also be used to control and supply a natural air draft when it is not desired to use the blower unit 54—93.

It will thus be seen from the foregoing description, considered in conjunction with the accompanying drawings, that the present invention accomplishes its intended objects, and has desirable advantages and characteristics, including those hereinbefore pointed out, and others which are inherent in the invention.

We claim:

1. In a heating apparatus, a unitary wheel-bearing supporting carriage adapted to be moved as a unit into and out of the firebox of a furnace, a plurality of grate drums rotatably mounted in parallel relation upon said wheel-bearing carriage, means carried by said wheel-bearing carriage for imparting a step by step rotary movement to said grate drums, said means including means for moving the grate drums at the fuel receiving end of said grate surface through a greater circumferential distance or step than that which is imparted to the remaining grate drums at each operation thereof whereby each of said remaining grate drums is moved through a progressively shorter circumferential distance or step during each operation thereof, a plurality of stationary grate bars mounted upon said wheel-bearing carriage and extending parallel to said grate drums between the latter, said stationary grate bars cooperating with said grate drums to provide a substantially continuous grate surface, means upon said wheel-bearing carriage partitioning said grate surface into zones, means carried by said wheel-bearing carriage for supplying air draft to each of said zones, and manually operable control means for selectively controlling the air draft to each of said zones.

2. In a heating apparatus, a unitary wheel-bearing supporting carriage adapted to be moved as a unit into and out of the firebox of a furnace, a plurality of grate drums rotatably mounted in parallel relation upon said wheel-bearing carriage, means carried by said wheel-bearing carriage for rotating said grate drums, said means including a ratchet gear carried by each of said grate drums, and a reciprocating member movably mounted upon the said carriage at one side thereof and having a plurality of pawls mounted thereon engageable with each of said ratchets for imparting a step by step circumferential or rotary movement to each of said grate drums upon each reciprocation of said reciprocating member, said ratchet gears being of progressively increasing diameter considered in the order of their positions from the fuel receiving end of said grate surface to the ash discharging end thereof so that the smallest one of said ratchet gears is carried by the grate drum arranged at the fuel receiving end of said grate surfaces, a plurality of stationary grate bars mounted upon said wheel-bearing carriage and extending parallel to said grate drums between the latter, said stationary grate bars cooperating with said grate drums to provide a substantially continuous grate surface, means mounted upon said wheel-bearing carriage partitioning said grate surface into zones, means carried by said wheel-bearing carriage for supplying air draft to each of said zones, and manually operable control means for selectively controlling the air draft to each of said zones.

3. A heating apparatus comprising a wheel-bearing supporting carriage adapted to be moved as a unit into and out of the firebox of a furnace and including spaced upright side walls, a plurality of grate drums rotatably mounted upon said side walls and extending transversely therebetween, there being a valley between each two adjacent grate drums, a stationary grate bar arranged in each of said valleys and carried by said supporting carriage, said grate drums and said stationary grate bars cooperating to provide a substantially continuous grate surface, upright partition members carried by said wheel-supporting carriage and extending transversely between said side walls, said partition members dividing said grate surfaces into zones and supporting said stationary grate bars, means carried by said supporting frame at one end thereof for supplying fuel to the said grate surface, and means for imparting rotary motion to said grate drums so as to advance said fuel slowly over said grate surface.

4. A heating apparatus comprising a wheel-bearing supporting carriage adapted to be moved as a unit into and out of the firebox of a furnace and including spaced upright side walls, a plurality of grate drums rotatably mounted upon said side walls and extending transversely therebetween, there being a valley between each two adjacent grate drums, a stationary grate bar arranged in each of said valleys and carried by said supporting carriage, said grate drums and said stationary grate bars cooperating to provide a substantially continuous grate surface, upright partition members carried by said wheel-bearing supporting carriage and extending transversely between said side walls, said partition members dividing said grate surface into zones and supporting said stationary grate bars, means carried by said supporting frame at one end thereof for supplying fuel to the said grate surface, means for imparting rotary motion to said grate drums so as to advance said fuel slowly over said grate surface, and means for supplying a forced air draft to each of said zones including manually operable control means for selectively controlling the forced air draft to each of said zones.

5. In a heating apparatus, a unitary wheel-bearing supporting carriage adapted to be moved as a unit into and out of the firebox of a furnace, a plurality of grate drums rotatably mounted in parallel relation upon said wheel-bearing carriage, means carried by said wheel-bearing carriage for rotating said grate drums, a plurality of stationary grate bars mounted upon said wheel-bearing carriage and extending parallel to said grate drums between the latter, said stationary grate bars cooperating with said grate drums to provide a substantially continuous grate surface, a plurality of upright partition members mounted on said supporting carriage partitioning said grate surface into zones, each of said partition members being disposed below a corresponding one of said stationary grate bars, means carried by said carriage for supplying air draft to each of said zones, and manually operable control means for controlling the air draft to each of said zones selectively.

6. In a heating apparatus, a unitary wheel-bearing supporting carriage adapted to be moved as a unit into and out of the firebox of a furnace and including spaced upright side walls, a plurality of grate drums rotatably mounted in parallel relation upon said wheel-bearing carriage, and means carried by said wheel-bearing carriage for rotating said grate drums, a plurality of stationary grate bars mounted upon said wheel-bearing carriage and extending parallel to said grate drums between the latter, said stationary grate bars cooperating with said grate drums to provide a substantially continuous grate surface, a plurality of upright partition members carried by said carriage and extending transversely between said side walls, said partition members being disposed in spaced relation to each other with each of said partition members disposed below a respective one of said grate bars to divide said grate surface into zones, and means for selectively feeding air into said zones, said last named means comprising a plurality of ducts in one of said side walls with each of said ducts opening inwardly therethrough between a corresponding pair of said partition members, a plurality of dampers operatively associated with said ducts, and a plurality of control members slidably mounted on said carriage and operatively connected to said dampers for selectively operating said dampers so as to open and close said ducts.

7. A stoker unit comprising a wheel-bearing supporting frame adapted to be moved into and out of the firebox of a furnace and including spaced upright side walls, means affording an elongated substantially continuous grate surface, said means including a plurality of supporting shafts rotatably mounted upon said side walls and extending transversely therebetween in substantially parallel relation to each other, a pair of spaced supporting wheels mounted upon each of said shafts for rotation therewith, and a plurality of elongated one-piece grate segments mounted on the periphery of each of said pair of spaced wheels in spanning relation thereto and in annular series therearound, said grate segments having spaced openings therein for the passage of air transversely therethrough, means mounted at one end of said grate surface for feeding fuel thereto, means for imparting rotary motion to said shafts to thereby rotate said grate segments and move said fuel over said grate surface, and means for feeding air through said openings in said grate segments.

CHARLES T. DENKER.
ADOLPH T. JOHANSON.

REFERENCES CITED

The following references are of record in the file of this patent:

UNITED STATES PATENTS

| Number | Name | Date |
| --- | --- | --- |
| 835,477 | Shuter | Nov. 6, 1906 |
| 1,077,494 | Starkey | Nov. 4, 1913 |
| 1,079,645 | Hamilton | Nov. 25, 1913 |
| 1,127,939 | Stevens | Feb. 9, 1915 |
| 1,340,725 | Lloyd | May 18, 1920 |
| 1,341,868 | Vick | June 1, 1920 |
| 1,473,731 | McKenzie | Nov. 13, 1923 |
| 1,625,079 | Duncan | Apr. 19, 1927 |
| 1,629,282 | Lundgren | May 17, 1927 |
| 1,656,179 | Duncan | Jan. 17, 1928 |
| 1,831,816 | Magrath | Nov. 17, 1931 |
| 1,904,503 | Miller | Apr. 18, 1933 |
| 1,977,620 | Brown | Oct. 23, 1934 |
| 2,086,202 | Alpern | July 6, 1937 |

FOREIGN PATENTS

| Number | Country | Date |
| --- | --- | --- |
| 30,050 | Great Britain | 1910 |
| 473,096 | France | June 5, 1914 |